July 9, 1957  J. W. GRAY  2,798,518
HAND-MANIPULABLE PORTABLE BAND-SAW ASSEMBLY
Filed March 2, 1956  2 Sheets-Sheet 2
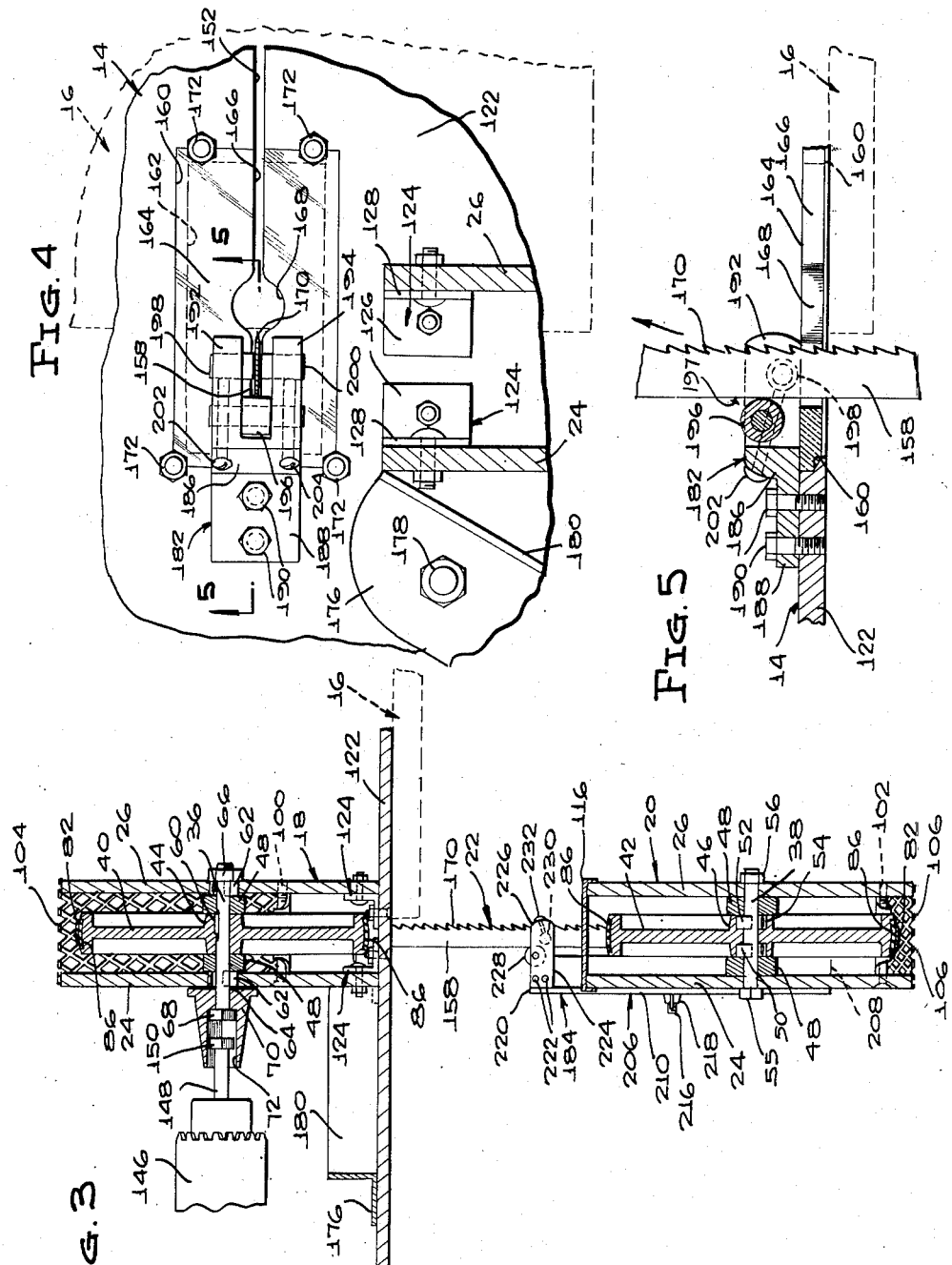
INVENTOR.
JAMES W. GRAY
BY
McMorrow, Berman & Davidson
ATTORNEYS

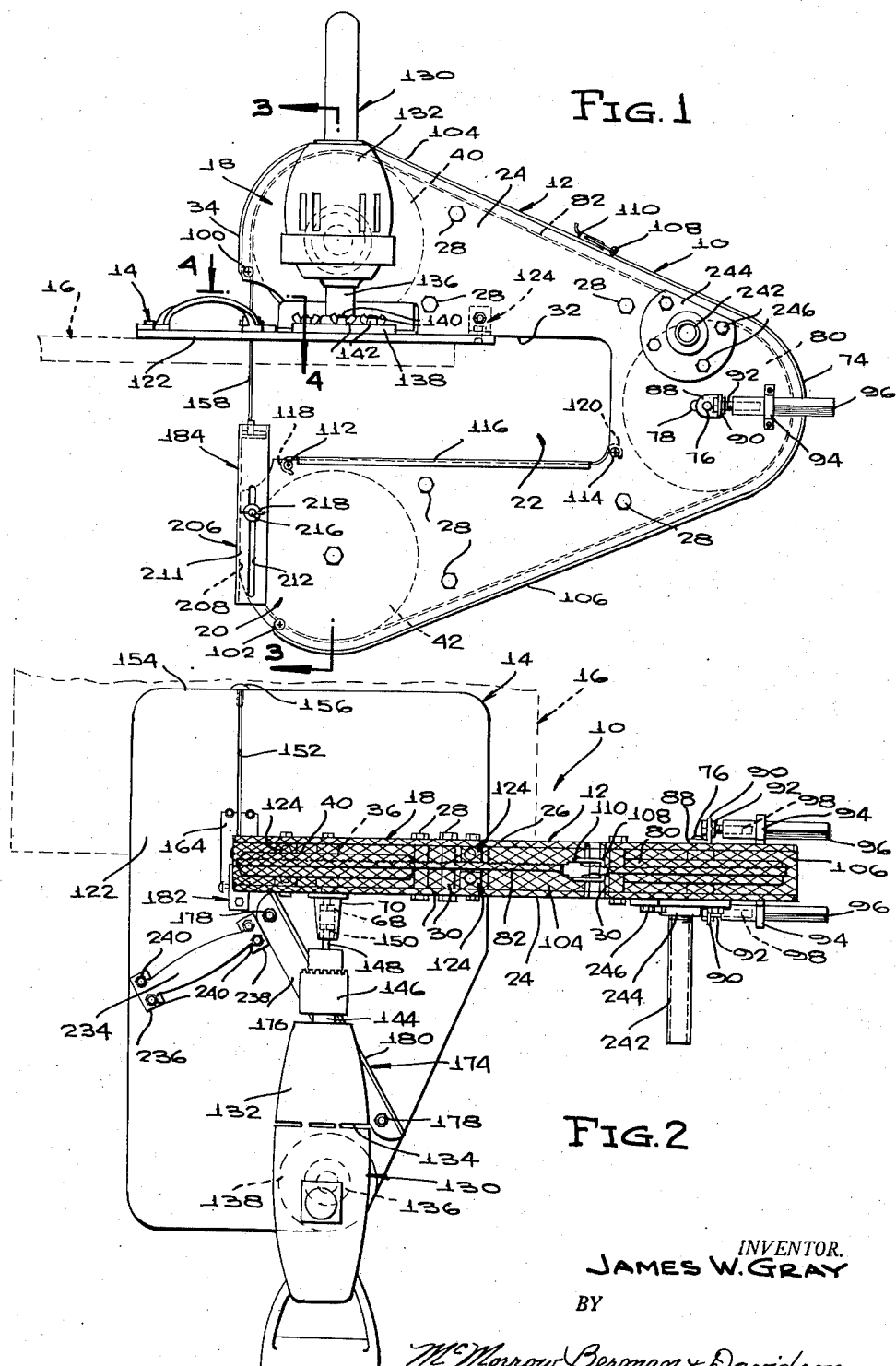

United States Patent Office 2,798,518
Patented July 9, 1957

2,798,518
HAND-MANIPULABLE PORTABLE BAND-SAW ASSEMBLY

James W. Gray, Tucson, Ariz.

Application March 2, 1956, Serial No. 569,148

1 Claim. (Cl. 143—157)

This invention relates generally to woodworking power tools and the like and is more particularly concerned with a novel hand-manipulable portable band-saw assembly for readily and expeditiously making various cuts in an underlying workpiece wherein similar operations were heretofore performed by relatively slow operating portable jig saws, coping saws, and the like, for example.

A primary object of the invention is to provide a novel hand-manipulable portable band-saw assembly comprising a support frame including overlying upper and lower leg members defining a work receiving notch portion therebetween, rotatable band-saw blade wheel support members journaled in planar alignment on the leg members of the support frame and including an endless band-saw blade journaled about the outer peripheries thereof, the band-saw blade including an intermediate cutting portion extending across the work receiving notch portion of said support frame, a table member secured normal to the support frame on a lower edge portion of the upper leg member thereof and including a transverse slot portion extending on opposite sides of the band-saw blade, said table member being engageable in overlying relationship on a workpiece to be cut, power means on the support frame in engagement with a band-saw blade wheel support member for rotating the band-saw blade from the lower toward the upper leg member, and handle means on the table member and support frame for manipulating the portable band-saw assembly on a workpiece upon which it operates.

Other objects of the invention in conformance with that set forth include in a novel portable band-saw assembly of the character set forth an improved transparent observation window element in the worktable member adjacent the transverse slot portion therein for observing the workpiece being cut; means for utilizing exhaust air from a motor assembly utilized for driving the band-saw blade for keeping the cutting portion thereof free from sawdust and the like, improvements in the means for rotatably supporting the band-saw blade on the support frame, and details of the support frame and the handle means.

A still further object of the invention in conformance with that set forth is to provide a novel hand-manipulable portable band-saw assembly of the character set forth which is readily and economically manufactured, easily used and maintained, and highly practical, serviceable and acceptable for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a side elevational view of the novel hand-manipulable portable band-saw assembly as viewed from the position of the operator thereof, showing in phantom lines a fragmentary portion of the workpiece to be worked upon;

Figure 2 is a top plan view of the novel band-saw assembly;

Figure 3 is an enlarged sectional view taken substantially on line 3—3 of Figure 1, with a portion of the power means thereof broken away;

Figure 4 is an enlarged fragmentary sectional view taken substantially on line 4—4 of Figure 1; and Figure 5 is a fragmentary sectional view taken substantially on line 5—5 of Figure 4.

Referring to the drawings in detail, the novel hand-manipulable portable band-saw assembly is indicated generally at 10 including a support frame indicated generally at 12, a worktable member indicated generally at 14, the table member 14 operating on the upper surface portion of a workpiece indicated generally at 16.

The support frame 12 includes upper and lower leg members indicated generally at 18 and 20, respectively, which are in overlying planar relationship defining therebetween a work receiving notched out portion 22 for receiving therein portions of the workpiece 16 when the same is manipulated when cutting circular portions in the workpiece, for example.

As seen in Figure 1, the support frame has a substantially V-shape when viewed in elevation, the leg members 18 and 20 thereof defining the leg members of the V. The frame member 12 is comprised of a pair of side panel elements 24 and 26 which are retained in spaced rigid relationship by means of transverse bolt assemblies 28 which extend through suitable tubular spacer sleeve elements 30, see Figure 2, for example. Each of the side panel elements 24 and 26 have formed therein mutually aligned notch portions 32, only one being shown, which define the work receiving notch portion in said support frame.

Extending inwardly from the side edge 34 of the support frame 12 in spaced relationship through the leg members 18 and 20 are transverse support shafts 36 and 38 (Figure 3) which extend through suitable aperture portions in the side panel elements 24 and 26, the shaft 36 having keyed thereon a band-saw blade support wheel member 40 which is in planar alignment with a band-saw support wheel member 42 suitably keyed on the support shaft 38. The shafts 36 and 38 have circumposed thereon on opposite sides of the hub portions 44 and 46 of the wheels 40 and 42, respectively, suitable spacer washer elements 48, constructed from a fibrous material, for example, said washer elements maintaining the band-saw blade support wheel members in spaced alignment between the side panels 24 and 26. The hub portion 46 of the support wheel member 42 includes therein oppositely disposed annular recessed portions 50 and 52, see Figure 3, which contain therein suitable bearing assemblies 54, such as needle bearings, for example, which are in engagement with adjacent side portions of the washer elements 48 permitting free rotation of the band-saw support wheel member 42. The shaft member 38 includes a head portion 55 thereon in engagement with the side panel element 24, the other end of said shaft being suitably threaded for receiving thereon a securing nut 56.

Also as seen in Figure 3, the support wheel member 40, which may be designated as the drive wheel of the band-saw assembly, is suitably keyed at 60 in the hub 44 on the transverse shaft 36, the side panel elements 24 and 26 having suitably disposed therein bearing assemblies 62 through which the support shaft 36 extends. The bearing assemblies 62 engage the spacer washer elements 48 and permit ready rotation of the drive or support wheel member 40. The shaft 36 may have circumposed about an intermediate portion thereof a lock washer element 64 adjacent the outer side of the side panel element 24, the other end of the said support shaft 36 being suitably threaded for receiving a securing nut 66 thereon. The shaft 36 continues laterally away from the side panel element 24 and terminates in an enlarged head portion 68 which extends through a coupling sleeve element 70, said head portion being contained in an enlarged bore portion 72 of said coupling sleeve element. As will subsequently be described, the coupling sleeve element 70 is utilized for the purpose of driving the band saw assembly, however, any suitable power means may be utilized for this purpose and there is no intent to restrict the invention to the specific drive means or power means described in detail herein. The bore portion 72 will preferably be of a polygonal cross section whereby rotation of the coupling element 70 will result in rotation of the aforementioned support shaft. Disposed inwardly from the rear end portion 74 of the support frame member 12 is a transverse support shaft 76 (Figures 1 and 2) which is journaled in oppositely disposed slot portions 78 extending through the side elements 24 and 26 (only one of said slot elements 78 being shown in Figure 1) said slot portions extending in substantially longitudinal alignment with the notch portions 32 of said side panel elements for the purpose of adjusting the tension on the band-saw blade as will subsequently become apparent. The support shaft 76 includes therewith spacer washers and bearing assemblies similar to those described in detail relative to the band-saw support wheel member 42, said shaft having journaled thereon an idler or adjustment band-saw blade support wheel member 80 over which an intermediate portion of the band saw blade 82 is journaled. The band-saw blade support wheel members 40, 42 and 80 have extending about the outer periphery recess portions receiving therein a suitable friction increasing material 86, see Figure 3, of rubber or the like, for example, for increasing the friction engagement of the band-saw blade with said support wheel members.

The support shaft 76 of the support wheel member 80 extends laterally from the side panel elements 24 and 26 and has secured on its opposite ends which may be conveniently threaded, for example, angle bracket elements 88, see Figures 1 and 2, each of which includes a laterally extending leg portion 90 which is transversely apertured for receiving therein a screw element 92. Secured on the side panel elements 24 and 26 in rearwardly spaced relationship from the transverse slot portion 78 therethrough, are journal bracket elements 94 which rotatably receive therein adjusting sleeve elements 96 each of which include an internally threaded bore portion 98 receiving therein one of the screw elements 92. Thus rotation of the sleeves 96 will be effective to move the band-saw blade support wheel member 80 toward or away from the support wheel members 40 and 42 thus being effective to adjust the tension of the band-saw blade 82. The sleeves 96 also serve as a tracking control for the band-saw blade 82 i. e. by slightly differing the tension applied by the individual sleeves 96, it is possible to maintain the blade in a proper operating position over the support wheel members 40 and 42, and in proper orientation relative to blade guide assemblies to be subsequently described.

Extending transversely through oppositely disposed aperture portions of the side panel elements 24 and 26 adjacent the forward end 34 of the support frame member 12 are upper and lower mounting pin elements 100 and 102, respectively, which have extending thereabout a hooked end portion of suitably conformed guard or panel elements 104 and 106, respectively, which extend from said mounting pin elements 100 and 102 about the entire outer periphery of the side panel elements 24 and 26, see Figure 1, said element 106 terminating in an upwardly extending hook portion 108 in spaced relationship from a pivotal trunk latch element 110 suitably secured on an adjacent spaced end portion of the element 104 whereby engagement thereof with the hook end portion 108 of element 106 permits securement of the elements 104 and 106 on the support frame as well as permitting ready removal thereof. The elements 104 and 106 may be constructed from an expanded metal as clearly seen in Figures 2 and 3 for the purpose of preventing the accumulation of sawdust and the like within the frame 12 of the band-saw assembly.

The side panel elements 24 and 26 have extending therebetween mounting pin elements 112 and 114 which are respectively located in spaced relationship within the work receiving notch portion 22 of the support frame 12 and receive thereon a suitable cover panel element 116, said cover panel element 116 having hook end portions 118 and 120 extending over the respective mounting pin elements 112 and 114. The cover panel element 116 is of a solid material and prevents the accumulation of sawdust and the like on the support wheel 42.

The table member 14 includes a planar body portion 122 which extends into the work receiving notch portion 22 of the support frame 12, said table member being disposed substantially normal to the support frame 12 adjacent the upper edge of the notch portions 32 of the side panel elements 24 and 26, see Figure 1. If desired, the body portion 122 of the table member is secured to the side panel elements 24 and 26 by means of suitable angle brackets and machine screws indicated generally at 124, said angle brackets having leg portions 126 secured on the upper surface of the body portion 122, and leg portions 128 are secured to inner surface portions of the side panel elements 24 and 26, see Figure 4.

Indicated generally at 130 is the power means for the band saw-blade assembly which may comprise a suitable electric motor having a sufficient rating for driving the band-saw blade assembly, an electric drill motor, for example, being acceptable for this purpose. The motor power means 130 includes a casing member 132 and may be air cooled having exhaust air portions 134 extending thereabout for a purpose to subsequently become apparent. The motor casing member 132, see Figure 1, has integrally secured on the bottom portion thereof a suitable pipe nipple element 136 for securement in a mounting flange member 138 fixedly secured on suitable upwardly extending stud elements 140 by means of wing nuts 142. The motor 130 has extending from its shaft portion 144 a suitable chuck assembly 146 which has secured therein a longitudinally extending bolt element 148 having an enlarged head portion 150, see Figure 3, received in the bore portion 72 of the coupling sleeve element 70, thus permitting driving of the band-saw support wheel member 40. Although the power means has been disclosed as being removable and being mounted on the table member in a specific manner, a motor may be a permanent part of said table member and different types of coupling means may be utilized for transmitting power therefrom to the band-saw support wheel members.

As seen in Figures 2, 4 and 5, the body portion 122 of the table member has extending therein a transverse slot portion 152 which extends into the forward or leading edge 154 of said body portion 122 permitting the insertion and removal of the band-saw blade 82 from the assembly. The slot portion 152 includes in the edge 154 a threaded portion for receiving therein a screw element 156 for preventing undue vibration of said body portion 122 and maintaining rigidity in the same. The band-saw blade 82 includes an intermediate cutting portion 158 which extends through the transverse slot portion 152 of the body portion 122 of the table member 14, said transverse cutting portion 158 extending across the work receiving notch portion 22 of the frame member between the upper and lower leg members 18 and 20. The body portion 122 of said table member includes a recess portion 160 therein, see Figures 4 and 5, and an enlarged transverse aperture 162 through said recess 160 receiving therein a transparent observation window element 164 which includes a transverse slot portion 166 in alignment with the transverse slot portion 152 of portion 122 of the table member, said transverse slot portion of the observation window including an intermediate enlarged portion 168 adjacent the cutting edge 170 of the band-saw blade cutting portion 158. Thus when the table member 14 is juxtaposed on the workpiece 16 said workpiece may be readily observed through the observation window so that various marks thereon may be seen for the purpose of cutting curves, straight lines, etc. Considering Figure 1, the band-saw blade wheel support members are rotated in a clockwise direction wherein the cutting portion 158 of the band-saw blade is rotated from the lower leg member 20 toward the upper leg member 18. The observation window 164 is retained in body portion 122 by means of suitable retaining screw elements 172 (Figure 4) which overlie edges of said observation window 164 and extend into the panel or body portion 122 of the table member 14.

Secured on the upper surface of the body portion 122 of the table member is an elongated baffle element 174 (Figure 2) which may comprise an angle member having a flange portion 176 suitably apertured for receiving fastening elements 178 through its opposite ends, said fastening elements 178 extending through the body portion 122 of said table member. The baffle member includes an upwardly extending flange portion 180 which is angularly directed toward the cutting portion 158 of the blade 82 for directing exhaust air from the electric motor exhaust portions 134 for blowing away sawdust, and the like, from the workpiece being worked upon.

In order to maintain substantial rigidity in the cutting portion 158 of the blade 82 upper and lower blade guide assemblies indicated generally at 182 and 184 are provided on the upper surface portion of the body portion 122 of the table member and in vertically extending relationship from the lower leg member of the support frame 12, respectively. As clearly seen in Figures 4 and 5, the upper blade guide assembly 182 comprises a body portion 186 having a rear flange 188 suitably apertured for receiving machine screw elements 190 therethrough for securement in apertured portions in the body portion 122 of the table member 14. The body portion 186 includes a pair of oppositely disposed parallel leg portions 192 and 194 which have extending therebetween a roller assembly 196 engageable with the back edge 197 of the cutting portion 158 of the blade for substantially absorbing the cutting pressure as well as permitting rotation of the saw blade in the direction indicated by the direction arrow in Figure 5. The leg portions 192 and 194 have extending transversely therethrough bearing elements 198 and 200, respectively, of any suitable material such as brass, for example, for engagement with the opposite sides of the cutting portion 158 of the saw blade for absorbing side thrust thereon when curves are being cut with the band-saw blade assembly. The bearing elements 198 and 200 in conjunction with the roller element 196 may all be defined as bearing elements engageable with the respective side and back portions of the cutting portion of the blade 82. The elements 198 and 200 are retained in a fixed position by means of suitable screw elements 202 and 204 disposed in suitable internally threaded bore portions extending longitudinally in intersecting relationship through the leg portions 192 and 194, respectively, for engagement on the outer periphery of the bearing elements 198 and 200.

The lower blade guide assembly 184 comprises a vertically extending angle member 206 (Figures 1 and 3) which has one flange portion 208 in engagement with a forward edge of the frame 12, the other flange 210 being juxtaposed on the side panel element 24 and including a longitudinally extending slot portion 212 which has extending therethrough a stud element 216 integral with the side panel element 24 and receiving thereon a wing nut element 218 for retaining the angle element 206 in a relatively fixed adjusted position on the frame 212. Secured on the upper end 220 of the angle member 206 by means of suitable fastening elements 222 is a body member 224 similar to body member 186 of the upper blade guide assembly, and including a pair of mutually parallel leg portions 226, only one being shown, which have extending therebetween the roller element 228 engageable with the back portion of the cutting portion 158 of the saw blade and including a pair of bearing elements 230 (only one being shown) which are in engagement with side portions of the cutting portion 158 of the saw blade, said bearing portions 230 being retained in a fixed adjusted position by means of a suitable screw element 232 extending into suitable internally threaded bore portions intersecting the portions of the leg members in which the bearing elements 230 are disposed.

For the purpose of readily manipulating and carrying the novel band-saw assembly, the worktable member 14 has secured on the upper surface of the body portion 122 centrally located upwardly extending handle member 234 which has mounting flange portions 236 and 238 suitably apertured for receiving fastening elements 240 therethrough such as machine screws, for example. The handle 234 will normally be engaged by the left hand of an operator of the assembly. Extending laterally from an upper edge portion of side panel element 24 is a second handle member 242 which may comprise a suitable rod element which terminates in a mounting flange portion 244 suitably apertured for receiving suitable fasteners 246 therethrough, such as machine screws, for example. This handle member 246 will be grasped by the right hand of an operator of the device.

Thus there has been disclosed a readily manipulable portable band-saw assembly which fully conforms with the objects of the invention heretofore set forth.

Various positional directional terms such as "upper," "lower," "forward," etc., are utilized herein and have only a relative connotation to aid in describing the device and it is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claim.

What is claimed as new is as follows:

A hand-manipulable portable band-saw assembly comprising a support frame including a pair of spaced overlying upper and lower leg members defining therebetween a notched out workpiece receiving portion, rotatable band-saw blade support means on the support frame including a pair of band-saw blade support wheel members journaled in planar spaced alignment on the leg members of the support frame, a flexible continuous band-saw blade including intermediate portions journaled over the outer peripheries of the support wheel members and including an intermediate cutting portion extending across the notched out workpiece receiving portion of said frame, a planar table member secured normal to the support frame on a lower edge portion of the upper leg member of said frame for engagement on the upper surface of a workpiece, said table member including an intermediate transverse slot portion disposed on opposite sides of the cutting portion of the band-saw blade, power means carried by the support frame in operative engagement with one of the band-saw blade support wheel members for rotating the band saw blade from the lower toward the upper leg member, and handle means on the table member and support frame for manipulating the portable band-saw assembly on a workpiece being cut, said power means comprising an air-cooled motor including an exhaust air outlet portion in a casing member thereof and an elongated baffle element on the upper surface portion of the worktable member extending diagonally from the exhaust air outlet portion to a point adjacent the transverse slot portion of the worktable member for directing exhaust air from the air-cooled motor toward the cutting portion of said bandsaw blade.

References Cited in the file of this patent

UNITED STATES PATENTS

| | | |
|---|---|---|
| 284,580 | Vernon | Sept. 4, 1883 |
| 575,416 | Connell | Jan. 19, 1897 |
| 1,530,682 | Lyman | Mar. 24, 1925 |
| 1,731,176 | Ross | Oct. 8, 1929 |
| 2,463,437 | Steiner | Mar. 1, 1949 |
| 2,541,080 | Lyon | Feb. 13, 1951 |
| 2,625,964 | Green et al. | Jan. 20, 1953 |
| 2,627,657 | Etchen | Feb. 10, 1953 |
| 2,695,522 | Papworth | Nov. 30, 1954 |
| 2,704,941 | Holford | Mar. 22, 1955 |

FOREIGN PATENTS

| | | |
|---|---|---|
| 530 of 1910 | Great Britain | Jan. 8, 1910 |
| 373,901 | Great Britain | June 2, 1932 |
| 317,214 | Italy | Apr. 27, 1934 |